United States Patent Office 3,435,088
Patented Mar. 25, 1969

3,435,088
CATALYST AND PROCESS FOR OLIGOMERIZING CONJUGATED DIENES
Ernest A. Zuech, Bartlesville, Okla., assignor to Phillips Petroleum Company, a corporation of Delaware
No Drawing. Filed Apr. 15, 1966, Ser. No. 542,764
Int. Cl. C07c 3/60, 3/10; B01j 11/82
U.S. Cl. 260—677                        10 Claims

ABSTRACT OF THE DISCLOSURE

Conjugated dienes such as butadiene are oligomerized, for example to linear dimers, using a catalyst formed from at least one nickel compound such as nickel acetylacetonate, at least one conjugated diene-organolithium adducts such as an adduct of n-butyllithium and butadiene, at least one phosphorous, arsenic, or antimony containing compound such as triphenyl phosphite, and at least one alcohol such as ethanol.

---

This invention relates to an oligomerization process and catalyst therefor.

Heretofore nickel-containing catalysts have been employed to convert conjugated dienes to cyclic oligomers.

It has now been found that conjugated dienes can be converted to linear oligomers, principally dimers, by contacting one or more conjugated dienes under oligomerization conditions with an effective oligomerizing amount of a catalyst system formed on contacting (1) at least one nickel compound selected from the group consisting of nickel halides, nickel salts of mono-, di-, and tribasic organic acids; and nickel chelates of β-diketones, (2) at least one conjugated diene-organolithium adduct, (3) at least one compound selected from the group consisting of organic phosphites, organic phosphines, organic arsines, and organic stibines, and (4) at least one alcohol.

Accordingly, the catalyst of this invention is that formed on contacting the above-mentioned components.

Accordingly, it is an object of this invention to provide a new and improved oligomerization process. It is another object of this invention to provide a new and improved oligomerization catalyst.

Other aspects, objects, and the several advantages of this invention will be apparent to those skilled in the art from the description and appended claims.

The conjugated dienes oligomerized by this invention are butadiene, isoprene, piperylene, and mixtures thereof.

The nickel compounds of this invention preferably include chlorides, bromides, and iodides of nickel; the nickel salts of mono-, di-, and tribasic organic acids which preferably are prepared from acids having from 1 to 20 carbon atoms per molecule, inclusive; and the nickel chelates of β-diketones have the formula

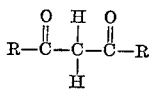

wherein each R is a radical selected from the group consisting of alkyl, cycloalkyl, aryl, and combinations thereof each having from 1 to 12 carbon atoms, inclusive.

Suitable acids include formic acid, propionic acid, caproic acid, pelargonic acid, lauric acid, myristic acid, margaric acid, arachidic acid, oxalic acid, succinic acid, adipic acid, suberic acid, sebacic acid, tricarballylic acid, citric acid, aconitic acid, and the like, and mixtures thereof. Suitable β-diketones include 2,4-pentanedione,
2,4-octanedione,
7,9-nonadecanedione,
9,11-eicosanedione,
1,3-dicyclopentyl-1,3-propanedione,
1-cyclohexyl-3-cyclononyl-1,3-propanedione,
1-cyclododecyl-3-phenyl-1,3-propanedione,
1,3-diphenyl-1,3-propanedione,
1,5-diphenyl-2,4-pentanedione,
1,3-di-p-tolyl-1,3-propanedione,
13,15-heptacosanedione, and the like, and mixtures thereof.

The organolithium compounds useful for forming the adduct component of the catalyst of this invention are represented by the formula $R'Li_x$ wherein $R'$ is selected from the group consisting of saturated aliphatic, saturated cycloaliphatic, aromatic, and combinations of these radicals and has from 2 to 14 carbon atoms, inclusive, and wherein $x$ is a whole integer of 1, 2, or 3.

Representative examples of organolithium compounds that can be employed are:

ethyllithium,
n-butyllithium,
isopentyllithium,
n-octyllithium,
3-ethylheptyllithium,
n-dodecyllithium,
cyclohexyllithium,
cycloheptyllithium,
cyclodecyllithium,
cyclododecyllithium,
1,2-dilithioethane,
1,4-dilithiobutane,
1,6-dilithiooctane,
1,5-dilithiodecane,
1,4-dilithiododecane,
1,2-dilithiocyclohexane,
1,4-dilithiocyclooctane,
1,5-dilithiocyclohendecane,
1,3,5-trilithiopentane,
phenyllithium,
1,3,5-trilithiobenzene,
1,2-dilithionaphthalene,
dilithiostilbene (1,2-dilithio-1,2-diphenylethane), and the like, and mixtures thereof. Presently preferred organolithium compounds are lithium alkyl compounds having from 2 to 6 carbon atoms per molecule.

The adduct is formed by reacting at least one of the above organolithium compounds with at least one of butadiene, isoprene and piperylene, the organolithium compound thereby adding to the conjugated diene. For example, butyllithium can add to butadiene in a conventional 1,4 manner thereby adding a butyl radical to the 1 carbon atom of a butadiene molecule and adding a lithium atom to the 4 carbon atom of that butadiene molecule.

The formation of the adduct is carried out by contacting the organolithium compound with the conjugated diene at a temperature generally in the range of from about −10 to about 80° C., preferably from about 0 to about 40° C., for a period of time sufficient to effect substantially complete formation of the desired adduct. The reaction can vary widely but will generally be from about 10 minutes to about 24 hours. The mol ratio of butadiene to molar equivalent of lithium employed will generally range from about 1/1 to about 25/1, although higher ratios can be employed if desired, the highest ratio employed being determined by economics rather than functionality. Generally, sufficient conjugated diene should be employed to insure complete reaction of the organolithium compound. The pressure employed in forming the adduct will be that sufficient to maintain the reactants substantially in the liquid phase. The pressure employed can be autogenous or higher if desired using conventional pressurizing materials such as nitrogen and the like.

The formation of the adduct can be carried out in the presence or absence of conventional, inert diluents. When diluents are employed, ethers, hydrocarbons and mixtures of two or more of each or both groups are preferred. The ethers employed generally should contain from 4 to 10 carbon atoms per molecule, inclusive, and can include ethyl ether, tert-butyl ether, n-amyl ether, isopropyl ether, ethyl n-propyl ether, tetrahydrofuran, dioxane, and the like. When hydrocarbons are employed they can be selected from the group consisting of alkanes, cycloalkanes, aromatic hydrocarbons, and mixtures thereof having from 4 to 10 carbon atoms, inclusive. Examples of these include n-butane, n-pentane, isopentane, x-hexane, n-heptane, isooctane, n-dodecane, cyclohexane, methylcyclohexane, cyclooctane, benzene, toluene, xylene, decalin, and the like.

The organic phosphites, phosphines, arsines, and stibines of this invention have the formulas $P(OR'')_3$ and $Y(R'')_3$, wherein $R''$ is a hydrocarbon radical containing from 1 to 14, preferably 1 to 7, carbon atoms and is a radical selected from the group consisting of alkyl, alkenyl, aryl, cycloalkyl, and combinations thereof, such as aralkyl and alkaryl, preferably alkyl, alkenyl, and aryl, and wherein Y is phosphorous, arsenic, or antimony.

Suitable phosphites include trimethylphosphite, dibutylhexylphosphite, trinonylphosphite, di-n-propyldodecylbutylstilbine, dimethylpropylphosphine, tridecylphosphine, tert-butyl-dicyclohexylphosphite, diphenylcyclopentylphosphite, tricyclooctylphosphite, trivinylphosphite, triallylphosphite, di(3-hexenyl)methylphosphite, tridecylphosphite, diphenyldodecylphosphite, and the like.

Suitable phosphines, arsines, and stibines include trimethylphosphine, trimethylarsine, tributylphosphine, tributylstibine, dimethylpropylphosphine, tridecylphosphine, tridodecylarsine, ditetradecyloctylphosphine, triphenylphosphine, triphenylstibine, diphenylcyclopentylphosphine, tricyclooctylphosphine, and the like, and mixtures thereof.

The catalyst system includes at least one alcohol having the formula $R'''(OH)_x$ wherein $x$ is 1 or 2 and R is selected from the group consisting of alkyl, alkylene, cycloalkyl, cycloalkylene, aralkyl, and aralkylene radicals and combinations thereof containing from 1 to 15 carbon atoms.

Examples of suitable alcohols include methanol, ethanol, 1-propanol, isopropanol, 1-butanol, isobutanol, sec-butanol, tert-butanol, 2-ethyl-1-hexanol, cyclohexylcarbinol, cyclohexanol, 1,3-cyclopentanediol, benzyl alcohol, lauryl alcohol, ethylene glycol, and the like and mixtures thereof.

The catalyst of this invention is formed before contact of same with the conjugated dienes to be oligomerized, and the adduct component is formed before combination with the nickel compound and phosphite, phosphine, arsine, stibine and alcohol components. Preferably, the adduct is combined with the nickel compound and the resulting combination is contacted with the phosphites, phosphines, arsines, or stibines, and alcohol. The catalyst can be formed in the presence or absence of a diluent. A diluent which is substantially inert to the reactants and products thereof is presently preferred and can be the ethers or hydrocarbons or mixtures thereof employed to make the adduct. The catalyst formation temperature can vary widely but will generally be in the range of from about −80 to about 80° C., preferably from about 0 to about 25° C. Atmospheric pressure or any convenient pressure at which the catalyst components are substantially in the liquid phase can be used. The time of formation of the catalyst can vary widely but will generally be within the range of from about a few minutes, e.g. 3, to about several hours, e.g. 3. It is presently preferred to add the alcohol last, after all the other catalyst components have been combined.

In forming the catalyst, the ratio of the lithium adduct to the nickel compound will generally be in the range of from about 2/1 to about 6/1 molar equivalents of lithium per mole of nickel compound. The amount of phosphite, phosphine, arsine, and/or stibine in the catalyst will vary from about 0.01 to about 10, preferably from about 0.1 to about 3, moles per mole of nickel in the nickel compound. The amount of organolithium compound in the catalyst should be an amount which is stoichiometrically sufficient to cause substantially complete reduction of the nickel to the zero valence. For example, the reduction of nickel bromide would require two molar equivalents of lithium per mole of nickel bromide, while the substantial reduction of nickel acetylacetonate would require 6 molar equivalents of lithium per mole of that compound since both the nickel and the carbonyl groups are reducible. The quantity of alcohol employed should be at least an equimolar amount with respect to the nickel in the nickel compound. However, greater amounts of alcohol can be employed so that the alcohol can additionally act as a diluent during oligomerization.

Oligomerization can be carried out under varying temperatures but will generally be in the range of from about 50 to about 150° C., preferably from about 70 to about 120° C. The pressure is generally that which is sufficient to maintain the reactants and product substantially in the liquid phase and can vary up to 1000 p.s.i.g. or higher. The reaction is conveniently carried out under autogenous pressures. The time of reaction can vary widely but will generally be from about 10 minutes to about 100 hours. The oligomerization can be carried out in either the absence or presence of additional substantially inert diluents. Diluents such as those employed in making the adduct can be used as well as mixtures of these. The amount of catalyst employed will be that which provides from about 0.1 to about 10 millimoles of nickel per mole of conjugated diene to be oligomerized.

The products of this invention are principally linear trienes with smaller amounts of heavier and cyclic materials also formed. For example, when 1,3-butadiene is oligomerized the products are principally 1,3,7-octatriene and 1,3,6-octatriene.

The products of this invention are useful a comonomers in making unsaturated olefin polymers that can later be crosslinked to make tough polymers for long wearing articles. The products can also be used to prepare polyfunctional compounds, e.g. the trienes can be used to prepare triepoxides that are useful in paints and adhesives.

The products of this invention can be recovered by conventional methods such as distillation, solvent extraction, and the like. It can be advantageous to contact the reaction mass with an aqueous mineral acid to destroy the residual catalyst and separate the catalyst components from the product-containing organic phase.

EXAMPLE I

Butadiene was converted to 1,3,7-octatriene and 1,3,6-octatriene in the presence of ethanol over the catalyst system comprising nickel acetylacetonate, trimethylphosphite, the adduct produced from the interaction of n-butyllithium and butadiene and ethanol.

An adduct was prepared by combining 27.1 grams of a 15.2 weight percent solution of n-butyllithium in hexane, 40 milliliters of n-pentane, and 33.5 grams of butadiene at 0 to 5° C. and then allowing the mixture to stand overnight at room temperature. A portion of this adduct (0.03 mole based on the lithium) was added to a cold mixture of 1.28 g. (0.005 mole) of nickel acetylacetonate in 25 ml. of n-pentane maintained in an ice bath. After 30 minutes in the ice bath, 1.25 g. of trimethyl phosphite was added. The cold mixture took on a light orange color and was then transferred to an autoclave together with 100 ml. of absolute ethanol and 202 g. of butadiene.

The autoclave was sealed and warmed to about 100° C. over a period of about one hour and maintained at that temperature for about 2 more hours. At the completion of the reaction the reaction mixture was distilled. The material boiling between 71.5° C. (100 mm. Hg) and 60° C. (3 mm. Hg) was collected and analyzed by gas-liquid chromatography. The conversion of butadiene was found to be 90.3 percent. A 105 g. quantity of 1,3,6-octatriene was found as well as 12.0 g. of 1,3,7-octatriene. The total yield of octatrienes was 58.7 percent and the ultimate yield was calculated to be 64 percent based upon the 90.3 percent conversion of butadiene.

EXAMPLE II

In this example butadiene was converted to octatrienes over a catalyst system which comprised nickel acetylacetonate, triethyl phosphite, the adduct obtained by the interaction of n-butyllithium and butadiene, and ethanol.

The catalyst was prepared by blending 9 g. of a 21.5 weight percent solution of n-butyllithium in hexane, 20 ml. of an n-pentane, and 14.0 g. of butadiene at 0 to 5° C. and allowing the mixture to stand overnight at room temperature. This mixture was then added to a previously cooled (0 to 5° C.) mixture of 1.29 g. of nickel acetylacetonate and 10 ml. of n-pentane. This new mixture was stirred for one-half hour while in the ice bath and then 1.66 g. of triethyl phosphite was added.

A 1-liter autoclave was flushed with nitrogen, charged with the above-prepared catalyst, charged with 200 ml. of absolute ethanol, and finally charged with 193 g. of butadiene. The autoclave was sealed and then heated to 90° C. over a period of about 30 minutes and then maintained at that temperature for about 3½ hours.

At the conclusion of the reaction, the reaction mixture was distilled. The portion boiling between 32° C. (100 mm. Hg) and 50° C. (80 mm. Hg) was collected and analyzed by gas-liquid chromatography. The analysis showed that 102.1 g. of 1,3,6-octatriene and 22.7 g. of 1,3,7-octatriene were formed. The yield of octatrienes was 64.6 percent for the run and the calculated ultimate yield was 82.7 percent based on the 78.1 percent conversion of butadiene.

EXAMPLE III

Butadiene was converted to linear octatrienes in a manner similar to that of Example I except that tri(n-butyl) phosphite was used in lieu of trimethyl phosphite.

The catalyst was prepared by combining, at 0 to 5° C., 13.5 g. of a 15.2 weight percent solution of n-butyllithium in hexane with 17 g. of butadiene. After standing one day at room temperature, the above mixture was added to a cold solution of 1.36 g. of nickel acetylacetonate in 20 ml. of n-pentane in an ice bath. This mixture was maintained in the ice bath for one-half hour and then 2.65 g. of tri(n-butyl)phosphite was added. This new mixture was then maintained at 10 to 20° C. for 5 hours before charging to the 1-liter autoclave. One hundred ml. of absolute ethanol and 210 g. of butadiene were charged into the autoclave following the previous catalyst components. The autoclave was heated to 70° and maintained at that temperature for about 17 hours.

At the completion of the reaction, the reaction mixture was treated with 500 ml. of water made acid with hydrochloric acid. The resulting organic phase was separated and distilled. The portion boiling between 58° C. (95 mm. Hg) and 50° C. (3 mm. Hg) was collected. Gas-liquid chromatography of this distillate indicated that the yield of linear octatrienes was 121.5 g. or 58 percent, and the ultimate yield was calculated to be 78 percent based on the 74 percent conversion of butadiene.

EXAMPLE IV

Butadiene was converted to linear octatrienes in a manner similar to that of Example I except that triphenyl phosphite was used in lieu of trimethyl phosphite.

The catalyst was prepared by combining, at 0 to 5° C., 27 g. of a 15.2 weight percent solution of n-butyllithium in hexane, 40 ml. of n-pentane, and 29 g. of butadiene. The mixture was allowed to stand about one day at room temperature. A portion of this adduct (0.03 mole based on lithium) was then added to a suspension of 1.28 g. of nickel acetylacetonate in 25 ml. of pentane which had been cooled in an ice bath. After 30 minutes, in the ice bath, 3.10 g. of triphenyl phosphite was added. This new mixture was then charged to a 1-liter autoclave along with 100 ml. of absolute ethanol and 192 g. of butadiene.

The autoclave was sealed and then heated to 100° C. and maintained at that temperature for about 3 hours. The reaction mixture was then subjected to distillation and the portion boiling between 30° C. (100 mm. Hg) and 80° C (100 mm. Hg) was collected. The distillate was analyzed by gas-liquid chromatography. The yield of linear octatrienes was found to be 127.2 g. or 66.3 percent. The ultimate yield was calculated to be 81.1 percent based on the 81.8 percent conversion of butadiene.

Reasonable variations and modifications are possible within the scope of this disclosure without departing from the spirit and scope thereof.

I claim:

1. The catalyst formed by contacting (1) at least one nickel compound selected from the group consisting of nickel halides, nickel salts of mono-, di-, and tribasic organic acids, and nickel chelates of β-diketones, (2) at least one conjugated diene-organolithium adduct, (3) at least one compound selected from the group consisting of organic phosphite, organic phosphine, organic arsine, and organic stibine, and (4) at least one alcohol, the amount of (3) present being from about 0.01 to about 10 moles per mole of nickel in (1), the amount of (2) present being sufficient to cause substantially complete reduction of the nickel in (1) to zero valence, the amount of (4) present being at least equimolar with respect to the nickel in (1).

2. The catalyst according to claim 1 wherein said nickel compounds include chlorides, bromides, and iodides of nickel, nickel salts of mono-, di-, and tribasic organic acids having from 1 to 20 carbon atoms per molecule, inclusive, and nickel chelates of β-diketones represented by the formula

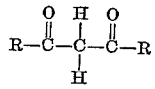

wherein each R is at least one radical selected from the group consisting of alkyl, cycloalkyl, aryl, and combinations thereof each having from 1 to 12 carbon atoms, inclusive, said adduct is the reaction product of at least one of butadiene, isoprene, and piperylene with an organolithium compound of the formula R'Li$_x$ wherein R' is a radical selected from the group consisting of saturated aliphatic, saturated cycloaliphatic, aromatic, and combinations thereof having from 2 to 12 carbon atoms, inclusive, and x is a whole integer selected from the group 1, 2, and 3, and said phosphite, phosphine, arsine, and stibine, are represented by the formulas P(OR")$_3$ and Y(R")$_3$, wherein R" is a radical containing from 1 to 12 carbon atoms selected from the group consisting of alkyl, alkenyl, aryl, and cycloalkyl, and wherein Y is phosphorous, arsenic or antimony.

3. The catalyst according to claim 1 wherein said alcohol is at least one compound having the formula R'''(OH)$_x$ wherein x is 1 or 2 and R''' is a hydrocarbon radical having from 1 to 15 carbon atoms selected from the group consisting of alkyl, alkylene, cycloalkyl, cycloalkylene, aralkyl, aralkylene, and combinations thereof, and the amount of alcohol employed is at least equimolar with respect to the nickel in said nickel compound.

4. The catalyst according to claim 1 wherein the ratio of said adduct to said nickel compound is in the range of from about 2/1 to about 6/1 molar equivalents of lithium per mole of nickel in the compound, and contacting is carried out at a temperature in the range of from about −80 to about 80° C. and under a pressure sufficient to maintain the components substantially in the liquid phase.

5. The catalyst according to claim 1 wherein the catalyst is formed in an extraneous diluent selected from the group consisting of ethers having from 4 to 10 carbon atoms per molecule, inclusive, and aliphatic, cycloaliphatic, aromatic and combinations thereof, hydrocarbons having from 4 to 10 carbon atoms per molecule, inclusive, and mixtures of said ethers and hydrocarbons.

6. The catalyst according to claim 1 wherein the alcohol is at least one selected from the group consisting of monohydric and dihydric aliphatic and cycloaliphatic hydrocarbons having from 1 to 15 carbon atoms per molecule, inclusive.

7. The catalyst according to claim 1 wherein said nickel compound is nickel acetylacetonate, said adduct is that of n-butyllithium and butadiene, component (2) is at least one of trimethylphosphite, triethylphosphite, tri-(n-butyl)-phosphite, and triphenylphosphite, and the alcohol is ethanol.

8. The process of oligomerizing at least one conjugated diene selected from the group consisting of butadiene, isoprene, and piperylene, by contacting same under oligomerization conditions with an effective oligomerizing amount of the catalyst of claim 1.

9. The process according to claim 8 wherein the catalyst is present in the amount of from about 0.1 to about 10 millimoles of nickel in the nickel compound per mole of conjugated diene, the oligomerization temperature is in the range of from about 50 to about 150° C., and the pressure is sufficient to maintain the reactants substantially in the liquid state.

10. The process of oligomerizing butadiene by contacting same at a temperature in the range of from about 70 to about 120° C. with the catalyst of claim 7, the catalyst being employed in an amount of from about 0.1 to about 10 millimoles of nickel in said nickel acetylacetonate per mole of butadiene.

References Cited

UNITED STATES PATENTS 3,219,716 11/1965 Wittenberg et al. ____ 260—666
3,238,265 3/1966 Mueller.
3,277,099 10/1966 Seibt et al.

PAUL M. COUGHLAN, Jr., *Primary Examiner.*

U.S. Cl. X.R.

252—429